Figure 4:
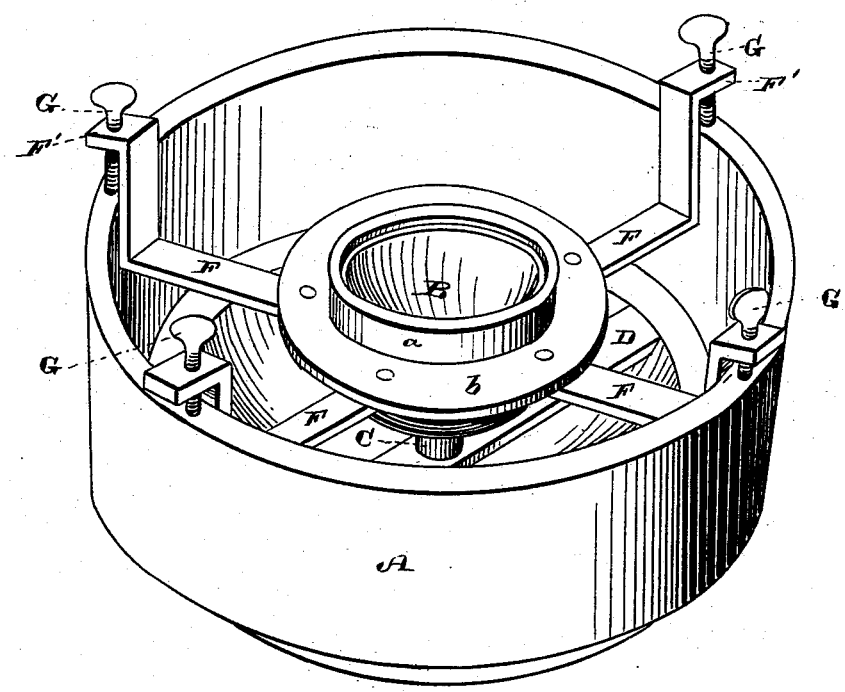

(No Model.)  2 Sheets—Sheet 1.
A. LUSK.
SOLDERING MACHINE.
No. 261,366.   Patented July 18, 1882.
Fig. 1.
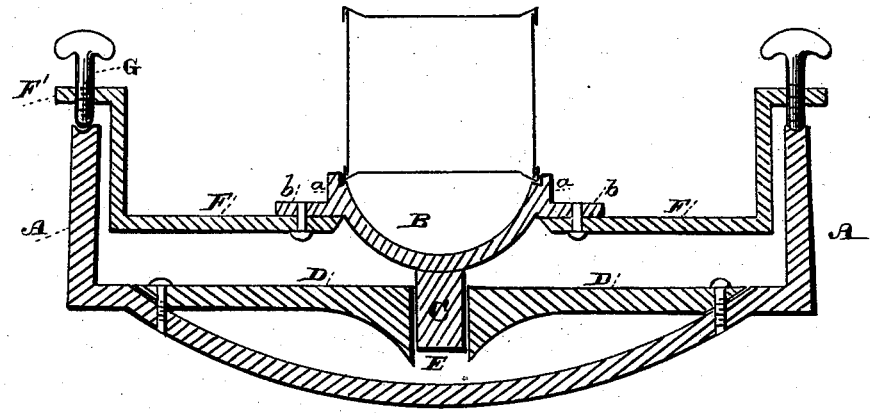
Fig. 2.
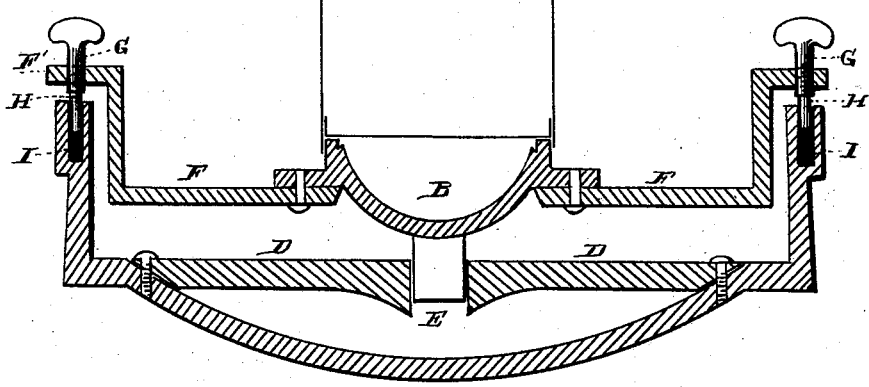
Fig. 3.
Witnesses,
Geo. H. Strong
B. H. Krouse
Inventor
A. Lusk.
By Dewey & Co.
Attorneys (No Model.)  2 Sheets—Sheet 2.

A. LUSK.
SOLDERING MACHINE.

No. 261,366.  Patented July 18, 1882.

Witnesses,
Geo. H. Strong.
S. H. Nourse

Inventor
A. Lusk.
By Dewey & Co.
Attorneys

United States Patent Office.

ALBERT LUSK, OF SAN FRANCISCO, CALIFORNIA.

SOLDERING-MACHINE.

SPECIFICATION forming part of Letters Patent No. 261,366, dated July 18, 1882.

Application filed May 2, 1882. (No model.)

*To all whom it may concern:*

Be it known that I, ALBERT LUSK, of the city and county of San Francisco, State of California, have invented an Improved Soldering Apparatus; and I hereby declare the following to be a full, clear, and exact description thereof.

My invention relates to an apparatus for soldering cans; and it consists in certain details of construction, as hereinafter fully described and specifically claimed.

Referring to the accompanying drawings for a more complete explanation of my invention, Figures 1 and 2 are sections of my invention. Fig. 3 is a top view of the bar D. Fig. 4 is a perspective view.

A is a melting-pot to receive the solder, and it is placed over a furnace in the usual manner, so that the solder may be kept in a molten condition. Within this pot is placed the can-supporting float B, which may be made in any suitable form; but I prefer to make it, as shown in my Patent No. 251,909, with a close bottom, so that its power of flotation may be sufficient to raise it and the can to the surface quickly when the pressure is relieved after the joint has been depressed beneath the surface of the solder. The float may have a central stem, C, projecting from the bottom, and a transverse bar, D, may be fixed across the center of the melting-pot low enough down to allow the stem C to pass through a hole, E, in the center; but these are not essential to the successful working of the apparatus.

A difficulty arises with these soldering devices from the oxidation and formation of dross upon the surface of the solder. This dross flows in against the sides of the can and sticks to it, preventing a perfect closing of the joint, and forms unsightly rough projections. To prevent this I form a nearly or quite vertical side, $a$, extending from the top of the float downward a short distance, where it meets a broad horizontal flange, $b$, which extends around the float. When not in use the buoyancy of the float causes the upper surfaces of this flange to rise above the surface of the metal. When a can is placed upon it and depressed the solder flows across this flat table-like flange until it strikes the vertical portion $a$, when it flows back in a sort of reflex wave, which throws the dross back also, thus leaving a narrow space of clean bright metal to come in contact with the can, and this insures a perfect sealing of every joint.

Arms F are bolted or fixed to the periphery of the float $B$, so as to project radially toward the inner circumference of the pot, where they may be bent upward and then outward, so as to project over the edges, as shown at F'. Through these projecting ends screws G pass, having shoulders which rest upon the edges of the pot when the float has been depressed to the proper depth, and by these screws the depth to which the float and can are depressed may be exactly adjusted.

In order to guide the float and keep it in the center of the melting-pot with more exactness, the screws G may have stems H of smaller diameter continued below their ends, and these stems enter holes I, which are bored in the sides of the melting-pot. The stems thus move freely up and down in these holes and guide the float, while the shoulders at the end of the screws, striking the top of the pot, arrest the downward movement of the float and keep it exactly level, so that all sides of the can will be equally submerged in the solder.

By means of this apparatus any size or form of float may be used, either square, oblong, or round, and in size from a large coal-oil can down to a half-pound round can. The exactness of the peripheral guides and stops enables me to solder large cans with great accuracy and rapidity. The can may be set so that its flanges project over the sides of the float for certain kinds of joints, as shown in Fig. 2; or they may be set inside upon a ledge on the float for other forms of joint, as shown in Fig. 1.

Having thus described my invention, what I claim as new, and desire to secure by Letters Patent, is—

1. In a soldering apparatus, and in combination with the solder-pot A and float B, the guide-arms F and the adjusting-screws G, said screws having the extensions H moving in and guided by the holes I, substantially as herein described.

2. In a soldering apparatus, and in combination with the melting-pot A and the can support or float B, having the stem C projecting from its bottom, the removable transverse bar D, fixed across the pot, and having the hole E to receive the stem, substantially as herein described.

3. In a soldering apparatus, the can-supporting float B, having the sides $a$ nearly or quite vertical, and the horizontal flange $b$ extending outward from its base, substantially as and for the purpose herein described.

In witness whereof I hereunto set my hand.

A. LUSK.

Witnesses:
G. W. EMERSON,
S. H. NOURSE.